(12) United States Patent
Johnson et al.

(10) Patent No.: US 11,673,268 B2
(45) Date of Patent: Jun. 13, 2023

(54) FOOD-SAFE, WASHABLE, THERMALLY-CONDUCTIVE ROBOT COVER

(71) Applicant: The Charles Stark Draper Laboratory, Inc., Cambridge, MA (US)

(72) Inventors: David M.S. Johnson, Cambridge, MA (US); Justin Rooney, New York, NY (US); Cody Chu, Somerville, MA (US); Anthony Tayoun, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 801 days.

(21) Appl. No.: 16/570,855

(22) Filed: Sep. 13, 2019

(65) Prior Publication Data

US 2020/0086509 A1    Mar. 19, 2020

Related U.S. Application Data

(60) Provisional application No. 62/731,398, filed on Sep. 14, 2018, provisional application No. 62/730,918, (Continued)

(51) Int. Cl.
*B25J 19/00* (2006.01)
*B25J 9/16* (2006.01)
(Continued)

(52) U.S. Cl.
CPC .......... *B25J 9/1666* (2013.01); *B25J 9/0009* (2013.01); *B25J 9/16* (2013.01); *B25J 9/161* (2013.01);
(Continued)

(58) Field of Classification Search
CPC .................................................. B25J 19/0083
See application file for complete search history.

(56) References Cited

U.S. PATENT DOCUMENTS

| | | | |
|---|---|---|---|
| 4,512,709 | A | 4/1985 | Hennekes |
| 4,513,709 | A | 4/1985 | Hennekes |

(Continued)

FOREIGN PATENT DOCUMENTS

| | | |
|---|---|---|
| CN | 106313068 A | 1/2017 |
| CN | 107092209 A | 8/2017 |

(Continued)

OTHER PUBLICATIONS

Siciliano, B., et al. "Chapter 8—Motion Control—Robotics Modelling Planning and Control", In: Robotics Modelling Planning and Control, Dec. 23, 2009 60 pages.

(Continued)

*Primary Examiner* — Daniel L Greene
(74) *Attorney, Agent, or Firm* — Hamilton, Brook, Smith & Reynolds, P.C.

(57) ABSTRACT

A cover for an automated robot includes elastic sheets that are adhered to each other in a geometry. The geometry is configured to allow the elastic sheets to expand and contract while the automated robot moves within its range of motion. The elastic sheets are attached to the automated robot by elasticity of the elastic sheets. A first group of the elastic sheets forms an elastic collar configured to grip the automated robot at a distal end and a proximal end of the cover in a non-breakable manner such that during operation of the robot, the elastic sheets hold their elasticity and integrity without breaking.

20 Claims, 4 Drawing Sheets

Related U.S. Application Data filed on Sep. 13, 2018, provisional application No. 62/730,703, filed on Sep. 13, 2018, provisional application No. 62/730,934, filed on Sep. 13, 2018, provisional application No. 62/730,933, filed on Sep. 13, 2018, provisional application No. 62/730,947, filed on Sep. 13, 2018.

(51) Int. Cl.

| | | |
|---|---|---|
| *B25J 13/00* | (2006.01) | |
| *B25J 13/08* | (2006.01) | |
| *G06N 3/08* | (2023.01) | |
| *G10L 15/22* | (2006.01) | |
| *B65G 1/137* | (2006.01) | |
| *B25J 9/00* | (2006.01) | |
| *B25J 15/00* | (2006.01) | |
| *G06Q 10/0631* | (2023.01) | |
| *B25J 11/00* | (2006.01) | |
| *B25J 15/04* | (2006.01) | |
| *B25J 19/02* | (2006.01) | |
| *G05D 1/02* | (2020.01) | |
| *G06V 40/20* | (2022.01) | |
| *H04L 67/12* | (2022.01) | |
| *G05B 19/4061* | (2006.01) | |
| *A47J 44/00* | (2006.01) | |

(52) U.S. Cl.
CPC ........... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A * | 2/1990 | Morrison ............ B25J 19/0083 428/80 |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 | 11/2015 | Edsinger et al. |
| 9,189,742 B2 | 11/2015 | London |
| 9,259,840 B1 | 2/2016 | Chen |
| 9,346,164 B1 | 5/2016 | Edsinger et al. |
| 9,427,876 B2 * | 8/2016 | Mozeika ............. B62D 57/032 |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2 | 6/2022 | Zito et al. |
| 2002/0144565 A1 * | 10/2002 | Ambrose ............. B25J 19/0025 74/490.03 |
| 2002/0151848 A1 * | 10/2002 | Capote, Jr. ............. A61B 46/10 604/263 |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 | 9/2004 | Zhang |
| 2005/0004710 A1 | 1/2005 | Shimomura et al. |
| 2005/0193901 A1 | 6/2005 | Buehler |
| 2005/0171643 A1 | 8/2005 | Sabe et al. |
| 2005/0283475 A1 | 12/2005 | Beranik |
| 2006/0137164 A1 | 6/2006 | Kraus |
| 2006/0141200 A1 * | 6/2006 | D'Andreta ............. B05B 15/50 428/58 |
| 2006/0165953 A1 * | 7/2006 | Castelli ................ B25J 19/0075 428/99 |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 * | 10/2008 | Butterworth ............ B23P 19/04 428/35.2 |
| 2009/0075796 A1 | 3/2009 | Doll |
| 2009/0292298 A1 | 11/2009 | Lin et al. |
| 2010/0114371 A1 | 5/2010 | Tsusaka et al. |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1 | 10/2011 | Takazakura et al. |
| 2012/0016678 A1 | 1/2012 | Gruber |
| 2012/0255388 A1 * | 10/2012 | McClosky ........... B25J 19/0025 74/490.02 |
| 2012/0290134 A1 | 11/2012 | Zhao et al. |
| 2013/0079930 A1 | 3/2013 | Mistry |
| 2013/0103198 A1 | 4/2013 | Nakamoto et al. |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1 | 4/2015 | Roy |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1 | 10/2015 | Linnell et al. |
| 2015/0375402 A1 * | 12/2015 | D'Andreta ............ B32B 3/12 156/60 |

(56) References Cited

U.S. PATENT DOCUMENTS

| | | |
|---|---|---|
| 2016/0016315 A1 | 1/2016 | Kuffner et al. |
| 2016/0073644 A1 | 3/2016 | Dickey |
| 2016/0075023 A1 | 3/2016 | Sisbot |
| 2016/0103202 A1 | 4/2016 | Sumiyoshi et al. |
| 2016/0291571 A1 | 10/2016 | Cristiano |
| 2016/0372138 A1 | 12/2016 | Shinkai et al. |
| 2017/0004406 A1 | 1/2017 | Aghamohammadi |
| 2017/0080565 A1 | 3/2017 | Dalibard |
| 2017/0087722 A1 | 3/2017 | Aberg et al. |
| 2017/0133009 A1 | 5/2017 | Cho et al. |
| 2017/0168488 A1 | 6/2017 | Wierzynski |
| 2017/0178352 A1 | 6/2017 | Harmsen et al. |
| 2017/0322672 A1 | 11/2017 | Prats |
| 2017/0326728 A1 | 11/2017 | Prats |
| 2017/0334066 A1 | 11/2017 | Levine |
| 2017/0354294 A1 | 12/2017 | Shivaiah |
| 2017/0361461 A1 | 12/2017 | Tan |
| 2017/0361468 A1 | 12/2017 | Cheuvront et al. |
| 2018/0043952 A1 | 2/2018 | Ellerman et al. |
| 2018/0056520 A1 | 3/2018 | Ozaki |
| 2018/0070776 A1 | 3/2018 | Ganninger |
| 2018/0121994 A1 | 5/2018 | Matsunaga et al. |
| 2018/0144244 A1 | 5/2018 | Masoud et al. |
| 2018/0147718 A1 | 5/2018 | Oleynik |
| 2018/0147723 A1 | 5/2018 | Vijayanarasimhan |
| 2018/0150661 A1 | 5/2018 | Hall et al. |
| 2018/0200014 A1* | 7/2018 | Bonny .............. A61B 34/30 |
| 2018/0200885 A1 | 7/2018 | Ikeda et al. |
| 2018/0202819 A1 | 7/2018 | Mital |
| 2018/0214221 A1 | 8/2018 | Crawford et al. |
| 2018/0257221 A1 | 9/2018 | Toothaker et al. |
| 2018/0275632 A1 | 9/2018 | Zhang et al. |
| 2018/0338504 A1 | 11/2018 | Lavri et al. |
| 2018/0345479 A1 | 12/2018 | Martino et al. |
| 2018/0348783 A1 | 12/2018 | Pitzer et al. |
| 2018/0354140 A1 | 12/2018 | Watanabe |
| 2019/0001489 A1 | 1/2019 | Hudson et al. |
| 2019/0039241 A1 | 2/2019 | Langenfeld et al. |
| 2019/0049970 A1 | 2/2019 | Djuric et al. |
| 2019/0056751 A1 | 2/2019 | Ferguson et al. |
| 2019/0066680 A1 | 2/2019 | Woo et al. |
| 2019/0212441 A1 | 7/2019 | Casner et al. |
| 2019/0291277 A1 | 9/2019 | Oleynik |
| 2019/0310611 A1 | 10/2019 | Jain |
| 2019/0321989 A1* | 10/2019 | Anderson ............... B32B 7/02 |
| 2019/0381617 A1 | 12/2019 | Patrini et al. |
| 2020/0023520 A1 | 1/2020 | Yoshizumi |
| 2020/0030966 A1 | 1/2020 | Hasegawa |
| 2020/0047349 A1 | 2/2020 | Sinnet et al. |
| 2020/0070355 A1 | 3/2020 | Neumann et al. |
| 2020/0073358 A1 | 3/2020 | Dedkov et al. |
| 2020/0073367 A1 | 3/2020 | Nguyen et al. |
| 2020/0086437 A1 | 3/2020 | Johnson |
| 2020/0086482 A1 | 3/2020 | Johnson |
| 2020/0086485 A1 | 3/2020 | Johnson |
| 2020/0086487 A1 | 3/2020 | Johnson |
| 2020/0086497 A1 | 3/2020 | Johnson |
| 2020/0086498 A1 | 3/2020 | Johnson |
| 2020/0086502 A1 | 3/2020 | Johnson |
| 2020/0086503 A1 | 3/2020 | Johnson |
| 2020/0087069 A1 | 3/2020 | Johnson |
| 2020/0090099 A1 | 3/2020 | Johnson |
| 2020/0298403 A1 | 9/2020 | Nilsson et al. |
| 2021/0045828 A1* | 2/2021 | McBrien .............. A61B 46/10 |
| 2022/0066456 A1 | 3/2022 | Ebrahimi et al. |
| 2022/0184823 A1* | 6/2022 | Bonny .............. B25J 19/0079 |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A1 | 6/2015 |
| GB | 2550396 A | 11/2017 |
| JP | 2004295620 | 10/2004 |
| JP | 200849462 A | 3/2008 |
| JP | 2020028957 | 2/2020 |
| WO | WO-9903653 A1 * | 1/1999 .......... B25J 19/0075 |
| WO | 2005072917 A1 | 11/2005 |
| WO | WO-2007122717 A1 * | 11/2007 .......... B25J 19/0075 |
| WO | 2009045827 A2 | 4/2009 |
| WO | 20150117156 A | 8/2015 |
| WO | 20170197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Yang et al., "Obstacle Avoidance through Deep Networks based Intermediate Perception", Apr. 27, 2017, The Robotics Instiute, Carnegie Mellon University (Year: 2017). 13 pages.

Feddema, John T., et al., Model-Based Visual Feedback Control for a Hand-Eye Coordinated Robotic System, Aug. 1992, IEEE, vol. 25, Issue: 8, pp. 21-31 (Year: 1992).

Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

"Draper Spins Out Dexai Robotics", Mar. 21, 2019, retrieved from Internet from Feb. 5, 2020, pp. 1-2, https://www.draper.com/news-releases/draper-spins-out-dexai-robotics.

Anandan, T.M., "The Shrinking Footprint of Robot Safety", Robotics Online, Oct. 6, 2014. 10 pages, Online available at: https://www.robotics.org/content-detail.cfm/Industrial-Robotics-Industry-Insights/The-Shrinking-Footprint-0f-Robot-Safety/content_id/5059.

Anonymous: "Pate a pizza fine—Notre recette avec photos—Meilleur du Chef," 2019, 2 pages, Online available at: Retrieved from the Internet: URL: https://www.meilleurduchef.com/fr/recette/pate-pizza-fine.html# [retrieved on Dec. 5, 2019].

ATI Industrial Automation: Automatic/Robotic Tool Changers, "Automatic/Robotic Tool Changes", Tool Changer News, Downloaded from Internet Feb. 4, 2020, 2 pages. https://www.ati-ia.com/products/tootchanger/robot_tool_changer.aspx.

Blutinger, J., et al., "Scoop: Automating the Ice Cream Scooping Process", Introduction to Robotics MECE E4602, Group 8 Final Project, Dec. 2016, pp. 1-4.

Bollini, M., et al., "Interpreting and Executing Recipes with a Cooking Robot", Experimental Robotics, 2013, 15 pages.

Cao, Z., et al. "Realtime Multi-Person 2D Pose Estimation using Part Affinity Fields", Proceedings of the IEEE Conference on Computer Vision and Pattern Recognition, Apr. 14, 2017, 9 pages.

Charabaruk, Nicholas; "Development of an Autonomous Omnidirectional Hazardous Material Handling Robot"; . University of Ontario Institute of Technology (Canada). ProQuest Dissertations Publishing, 2015. 10006730, 144 pages (Year: 2015).

Dantam, N.T., et al. "Incremental Task and Motion Planning: A Constraint-Based Approach", Robotics: Science and Systems 12, 00052, 2016, 11 pages.

Dexai Robotics: "A Robot Company Is Born", retrieved from Internet from Feb. 5, 2020. https://draper.com/dexai-robotics, 6 pages.

Dexai Robotics: "Alfred Sous-Chef scooping ice-cream" Youtube, retrieved from Internet Jun. 8, 2018, 2 pages , Online avaialble at: https://www.youtube.com/watch?v=caNG4qrZhRU.

Draper—"A 'Perceptive Robot' Earns Draper Spots as KUKA Innovation Award Finalist" Aug. 30, 2017, 2 pages, retrieved from

(56) References Cited

OTHER PUBLICATIONS

Internet from Feb. 5, 2020. https://www.draper.com/news-releases/perceptive-robot-earns-draper-spot-kuka-innovation-award-finalist. Dynamic Robotic Manipulation—KUKA Innovation—Finalist Spotlight—Apr. 26, 2018 retrieved from Internet Feb. 5, 2020, pp. 1-3. https://youtube.com/watch?v=7wGc-4uqOKw.
Ferrer-Mestres, J., et al., "Combined Task and Motion Planning As A Classical AI Planning" arXiv preprint arXiv:1706.06927, 2017—arxiv.org; Jun. 21, 2017, 10 pages.
International Search Report and Written Opinino for PCT/US2019/051183 dated Jan. 14, 2020 entitled "Locating And Attaching Interchangeable Tools In-Situ". 8 pages.
International Search Report and Written Opinion for PCT/US2019/051040 dated Feb. 7, 2020 entitled "Manipulating Fracturable And Deformable Materials Using Articulated Manipulators". 15 pages.
International Search Report and Written Opinion for PCT/US2019/051061 dated Apr. 3, 2020 tilled "Controlling Robot Torque And Velocity Based On Context", 23 pages.
International Search Report and Written Opinion for PCT/US2019/051067 dated Jan. 16, 2020 entitled" Robot Interaction With Human Co-Workers". 9 pages.
International Search Report and Written Opinion for PCT/US2019/051148 dated Dec. 12, 2019 entitled "Food-Safe, Washable, Thermally-Conductive Robot Cover". 10 pages.
International Search Report and Written Opinion for PCT/US2019/051161 dated Jan. 15, 2020 entitled "Food-Safe, Nashable Interface For Exchanging Tools". 9 pages.
International Search Report and Written Opinion for PCT/US2019/051175 dated Jan. 3, 2020 entitled Stopping Robot Motion Based On Sound Cues. 9 pages.
International Search Report and Written Opinion for PCT/US2019/051176 dated Dec. 12, 2019 entitled"Determining How To Assemble A Meal". 10 pages.
International Search Report and Written Opinion for PCT/US2019/051177 dated Jan. 9, 2020 entitled Voice Modification To Robot Motion Plans. 8 pages.
International Search Report and Written Opinion for PCT/US2019/051179 dated Jan. 9, 2020 entitled"An Adapto or Food-Safe, Bin-Compatible, Washable, Tool-Changer Utensils". 11 pages.
International Search Report and Written Opinion for PCT/US2019/051180 dated Jan. 31, 2020 entitled "One-Click Robot Order". 13 pages.
Kaelbling, L.P, et al., "Integrated task and motion planning in belief space", The International Journal of Robotics Research; 2013,vol. 32, Issue 9-10, pp. 1-34.
Langsfeld, Joshua D..; "Learning Task Models for Robotic Manipulation of Nonrigid Objects"; University of Maryland, College Park. ProQuest Dissertations Publishing, 2017. 10255938, 230 pages (Year: 2017).

Martinez, J., et al., "On human motion prediction using recurrent neural networks", Proceedings of the IEEE Conference on Computer Vision and Pattern Recognition. 2017, 10 pages.
Nedunuri, S., et al., "SMT-Based Synthesis of Integrated Task and Motion Plan from Plan Outlines"; the Proceedings of the 2014 IEEE Intl. Cont. on Robotics and Automation (ICRA2014), 2014, 8 pages.
Olin College of Engineering, "Autonomous Tool Changer", Draper 2016-2017, retrieved from Internet Feb. 5, 2020, 1 page, http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously", Date unknown, 2 pages.
Saxena, A., et al., "RoboBrain: Large-Scale Knowledge Engine for Robots", arXiv preprint arXiv:1412.0691 (2014), 10 pages.
Schenck, C., et al., "Learning Robotic Manipulation of Granular Media", 1st Conference on Robot Learning, arXiv:1709.02833, Oct. 25, 2017, 10 pages.
Shimizu, T. et al., "Advanced Sampling Scheme Based on Environmental Stiffness for a Smart Manipulator", Robot Intelligence Technology and Applications, 2012, pp. 199-208.
Siciliano, B., et al. "Chapter 9—Force Control—Robotics Modeling Planning and Control", In: Robotics Modelling Planning and Control, Dec. 23, 2009, pp. 363-406.
Srivastava, S., et al. "Combined Task and Motion Planning Through an Extensible Planner-Independent Interface Layer"; 2014 IEEE international conference on robotics and automation (ICRA), 2014, pp. 639-646.
Stentz, A., et al., "A Robotic Excavator for Autonomous Truck Loading", In Proceedings of the IEEE/RSJ International Conference on Intelligent Robotic Systems, 1998, 9 pages.
Villegas, et al., "Learning to Generate Long-term Future via Hierarchical Prediction", In Proceedings of the 34th International Conference on Machine Learning (ICML), 2017, 21 pages.
Walker, J., et al., "The pose knows: Video forecasting by generating pose futures", In The IEEE International Conference on Computer Vision (ICCV), Oct. 2017, pp. 13332-13341.
Watson, J,. Kevin, et al. "Use of Voice Recognition for Control of a Robotic Welding Workcell", IEEE Control Systems Magazine; p. 16-18; (ISSN 0272-1708); 7, Jun. 1, 1987, pp. 16-18.
Wong, J. M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017, 8 pages.
Wong, J.M., et al., "SegICP-DSR: Dense Semantic Scene Reconstruction and Registration", Draper, arXiv:1711.02216; Nov. 6, 2017, 7 pages.
Wu, J., et al., "Real-Time Object Pose Estimation with Pose Interpreter Networks", IEEE/RSJ International Conference on Intelligent Robots and Systems (IROS), 2018, 8 pages.
Ye, G., et al., "Demonstration-Guided Motion Planning" Robotics Research. Springer Tracts in Advanced Robotics, vol. 100, 2017, pp. 1-16.

\* cited by examiner

FOOD-SAFE, WASHABLE, THERMALLY-CONDUCTIVE ROBOT COVER

RELATED APPLICATIONS

This application claims the benefit of U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018, U.S. Provisional Application No. 62/730,934, filed on Sep. 13, 2018 and U.S. Provisional Application No. 62/731,398, filed on Sep. 14, 2018.

This application is related to U.S. patent application Ser. No. 16/570,100, U.S. patent application Ser. No. 16/570,955, U.S. patent application Ser. No. 16/571,003, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/570,606, U.S. patent application Ser. No. 16/571,040, and U.S. patent application Ser. No. 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

In an embodiment, a non-porous elastic pull-over cover for an automatic robot can prevent moisture accumulation and material ingress. The cover may include cut sheets adhered or molded together to form an optimized geometry for robot articulation. Joints in the cover are smooth or non-existent to aid cleanability and washability in soiled conditions. The cover can be constrained at the tip and end of the cover with additional elastic material to be correctly positioned on the robot. Pressurized air may pass through the inside of cover to aid robot mobility and robot thermal regulation.

In an embodiment, a cover for an automated robot includes elastic sheets that are adhered to each other in a geometry. The geometry is configured to allow the elastic sheets to expand and contract while the automated robot moves within its range of motion. The elastic sheets are attached to the automated robot by elasticity of the elastic sheets. A first group of the elastic sheets forms an elastic collar configured to grip the automated robot at a distal end and a proximal end of the cover. A person of ordinary skill in the art can recognize that durable and durably means that during operation of the robot, the elastic sheets hold their elasticity and integrity without breaking.

In an embodiment, the elastic sheets are non-porous.

In an embodiment, the geometry is configured to durably stretch and durably contract the plurality of non-porous elastic sheets for the range of motion of the robot.

In an embodiment, the cover includes malleable media, placed between the robot and the elastic sheets, such that the malleable media expands the cover from a surface of robot and lessens constriction of elastic material onto the surface of the robot.

In an embodiment, the elastic sheets are inflated to expand the cover from a surface of the robot to lessen constriction of the elastic sheets onto the robot surface.

In an embodiment, the automated robot has up to seven degrees of freedom.

In an embodiment, the geometry is configured with an entry point and an exit point and to allow air to flow from the entry point to the exit point. The entry point or exit point can further be configured to allow cables or hoses to enter the cover.

In an embodiment, the cover further includes internal support rings that are configured to prevent the cover from directly contacting the robot to reduce friction with the robot. The internal support rings including at least one hole that permits air, fluid, cables or hoses to be passed through them. The support rings may provide external mounting points to fix an external cable or hose. The external mounting points may protrude through the cover, and a water-tight seal is formed by the elastic of the cover around the opening. The external mounting points may be attached via magnets.

In an embodiment, the internal support rings may include an internal ring which is fixed to the robot and rotates with the robot, and an external concentric ring which is able to rotate with respect to the internal ring by way of a ball bearing, sleeve bearing, or other low friction mechanism. The pass-through holes which carry cables maybe located in either the inner portion of the ring which rotates with the robot or the outer portion of the ring which stays nearly fixed to the elastic sheet. The friction between the elastic sheet and the outer ring causes it to rotate with respect to the inner ring as the robot joints move.

The cover may further include at least one external support ring that is configured to support an external cable or hose attached to the automated robot. The at least one external support ring can be at least one of a strap, hose clamp, and elastic strap.

In an embodiment, a second group of the non-porous elastic sheets forms a second elastic collar configured to grip the automated robot at a second opening of the cover.

In an embodiment, at least one of the distal end and the proximal end have a hole.

In an embodiment, the distal end and proximal end are closed.

In an embodiment, the cover further includes at least one internal support ring including an inner ring fixed to the robot and an outer ring which is connected to the inner ring by a low friction interface consisting of a ball bearing, roller bearing, or a sleeve.

In an embodiment, a method for covering an automated robot includes adhering a plurality of elastic sheets to each other in a geometry. The geometry configured to allow the plurality of elastic sheets to durably expand and contract while the automated robot performs its range of motion. The plurality of elastic sheets is attached to the automated robot by elasticity of the elastic sheets and free of any fastener. A first group of the elastic sheets forms an elastic collar configured to grip the automated robot at an opening of the cover.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Robots are used to manipulate tools and objects in environments with hazards that could damage the robot. For example, locations with excessive dust, moisture and vermin could harm the robot. Crevices in a traditional robot also serve as points of rot and contamination in food environments. To prevent the buildup of soil and the potential for bacteria and vermin to reside in or on the robot, surfaces should be smooth and non-porous to aid cleanability. Traditional robot covers are woven or inelastic, limiting the robot's range of movement. Over time, the porous surfaces also tend to be contaminated with food particles that lead to rot, vermin, and soiling.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1:
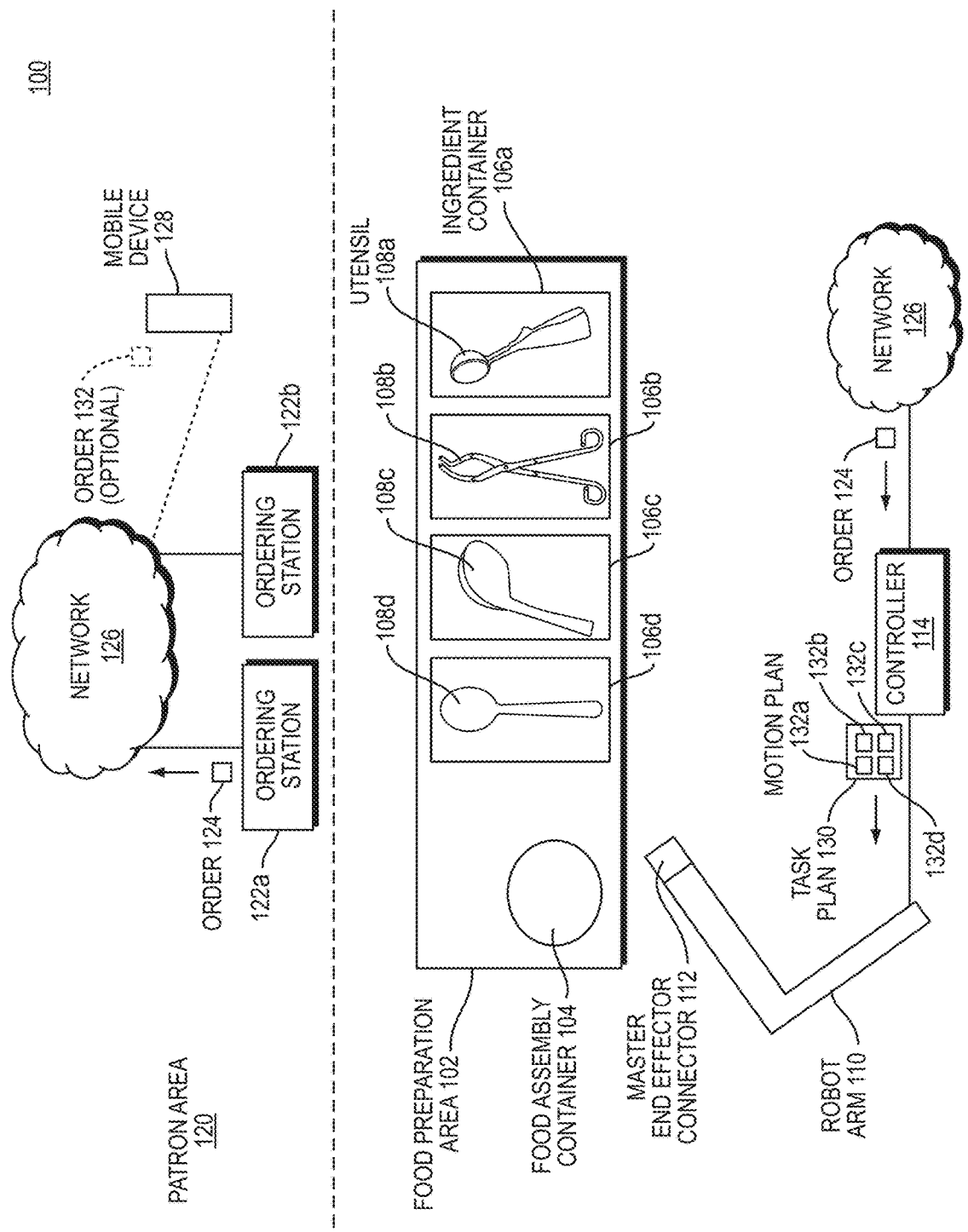
FIG. 1 is a block diagram illustrating an example embodiment of a quick service food environment of embodiments of the present invention.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack 109. The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-e, gather ingredients from the respective ingredient container 106a-d, and empty the utensil 108a-e in an appropriate location of a food assembly container 104 for the patron, which can be a plate, bowl, or other container. The robot arm 110 then returns the utensil 108a-e to its respective ingredient container 106a-d, the tool rack 109, or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

The present disclosure relates to a non-porous elastic cover for robots, and particularly to covers for robots in food service, production, and assembly.

Robots can manipulate tools and objects in environments with hazards that could damage the robot. For example, excessive dust, moisture, or vermin can harm a robot during its operation, or even during idle time. Crevices in a traditional robot can become points of rot and contamination, which is especially important in food environments. To prevent the buildup of particles such as dirt, soil, moisture, and creating a breeding ground for bacteria, viruses, and vermin to reside in or on the robot, surfaces should be smooth and non-porous to aid cleanability. It can be difficult to provide such a surface with robot machinery itself without sacrificing performance. Therefore, a robot cover is needed to provide protection to the robot.

Traditional robot covers are woven or inelastic. Such traditional robot covers limit the range of movement of the robot. Over time, the porous surfaces of these covers also tend to be contaminated with food particles that lead to rot, vermin, and soiling.

Figure 2B:
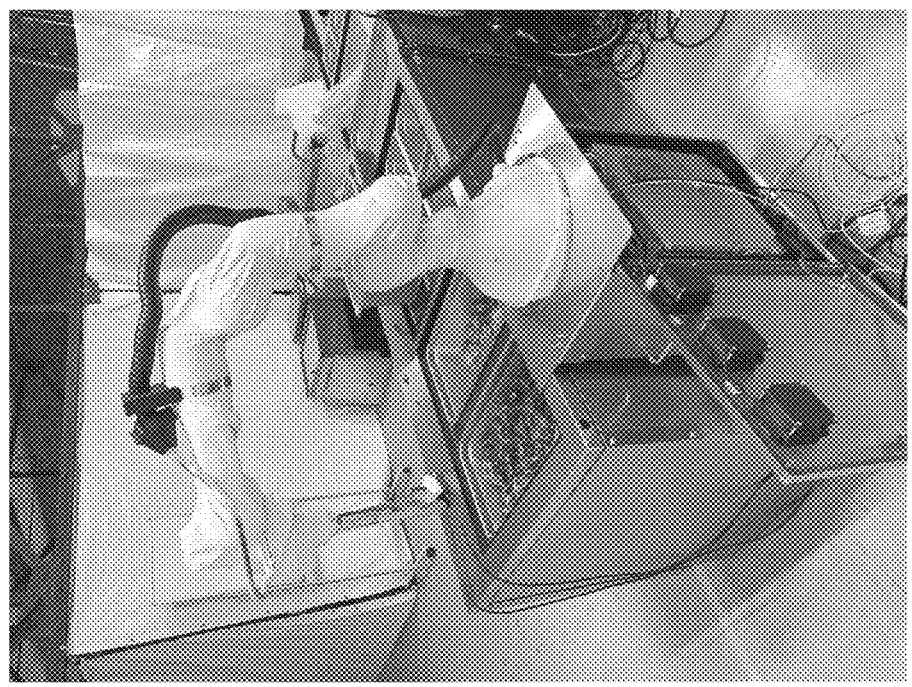
FIGS. 2A-2B are diagrams illustrating an example embodiment of a cover on a robotic arm.
Figure 2A:
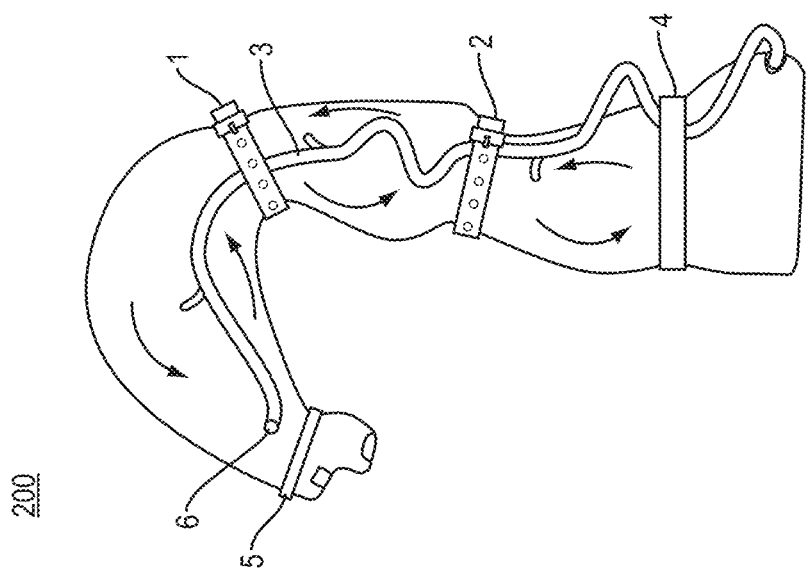

FIG. 2 is a diagram 200 of an example embodiment of a cover on a robotic arm. In an embodiment, external elastic bands or straps 1, 2 are employed to constrain cable harness 3. These straps 1, 2 are located on the top of the cover to constrain cable harness while allowing enough slack for maximum range of motion of the robot. The straps 1, 2 rest on top of the cover and on top of a support ring to allow air to flow freely inside the cover while the strap constricts the cable harness and cover. Air should move freely to inflate the non-porous elastic cover off the surface of the robot, and allow the robot to move with minimal constriction. Moving air through the system allows for heat management. In addition, the cover can be made out of latex, which can be sufficiently thermally conductive, if the material is thin enough to provide limited thermal resistance. Elastic constraints 4 and 5 are elastic portions of the cover that hold the cover to the robotic arm at the respective distal and proximal ends of the cover. Further, opening 6 allows external cabling to enter the cover.

One challenge in designing such a cover is that it is difficult to design and fabricate a cover which is able to allow the robot to operate all joints through their full ranges of motion. Certain configurations may constrict the robot or cause the cover material to tear or rupture. To fabricate a cover that allows the robot to operate through its full range of motion durably (e.g., nonbreakably or without breaking), a pattern of over 100 pieces are welded together using latex glue. The pattern is designed such that the cover is tight where the motion of the robot requires minimal change in the cover dimensions, and additional material is present in regions where robot joint motion requires substantial changes in the cover geometry. This approach results in a cover which supports any combination of joint angles for an up to 7-degree of freedom robot. Each elastic material is configured to stretch and contract in accordance with the range of motion of the robotic arm that it covers. In order to accommodate the motion of an articulated robot, the cover is designed to be form-fitting to the geometry of the robot, then regions of large motion are identified, and the local geometry is expanded such that the cover geometry is oversized so that including the stretch induced by the fabric, the total additional joint torque exerted by the cover is less than the maximum gravity compensation torque required for that joint at the maximum load capacity of the robot.

In an embodiment, the cover for an automated robot includes elastic sheets that are adhered to each other in a geometry. The geometry is configured to allow the elastic sheets to expand and contract while the automated robot moves within its range of motion. The elastic sheets are attached to the automated robot by elasticity of the elastic sheets. A first group of the elastic sheets forms an elastic collar 4 and 5 configured to grip the automated robot at a distal end and a proximal end of the cover.

Figure 3B:
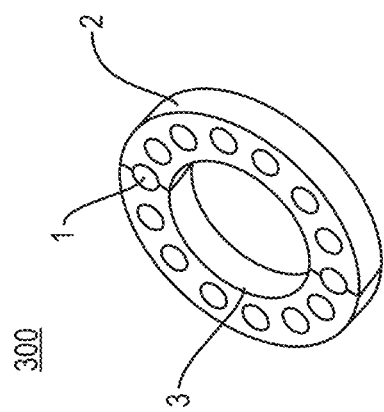
FIGS. 3A-3B are diagrams illustrating an internal support ring.
Figure 3A:
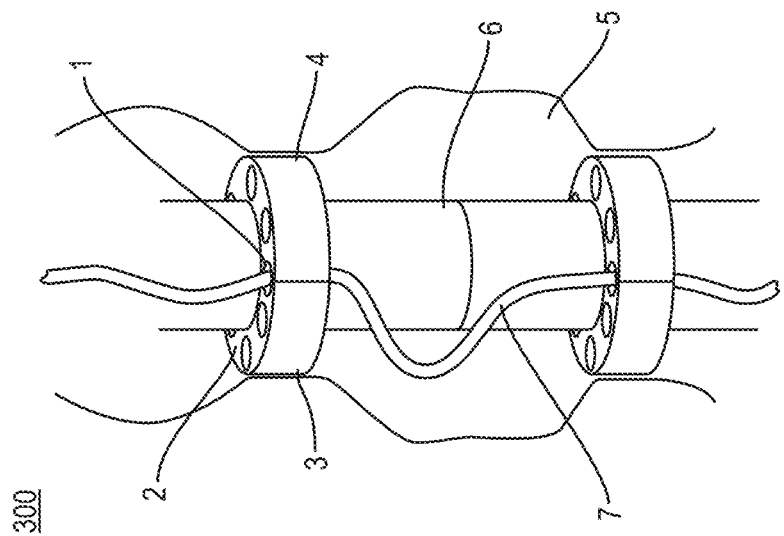

FIG. 3 is a diagram 300 of a support ring. Support rings can serve as internal or external cable routing interfaces for elastic straps to fit on top of and not constrict media or air flow. Support rings are not strictly necessary, but can improve performance in certain embodiments. For example, without support rings, cabling can go in external tube or housing. However, with support rings 1, the cabling 7 can run through separate holes 2 in the support ring 4 internal to the robot cover 5. Cables 7 are run outside the robotic arms 6 because slip rings do not support high bandwidth applications such as streaming video from sensors located at the wrist of the robot.

A person having ordinary skill in the art can see that the support ring of FIG. 3 includes an outer support ring 2 and an inner support ring 3. The support ring further includes holes 1 that cabling and wiring can be run through.

Figure 4B:
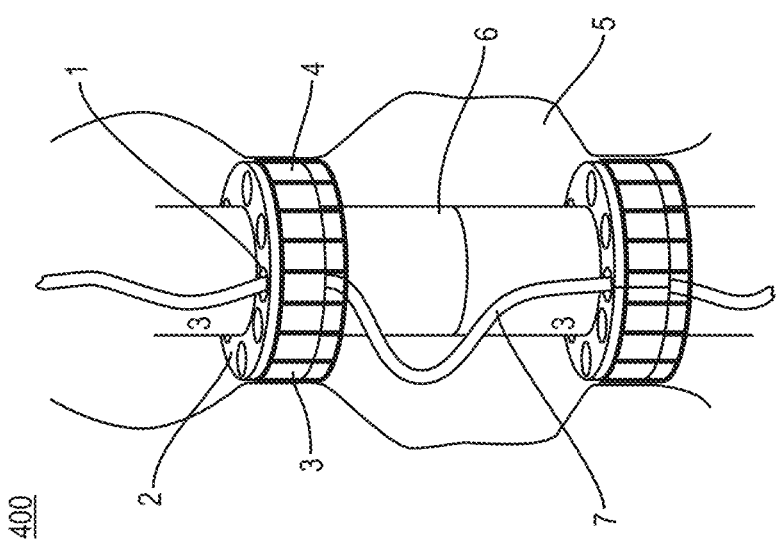
FIGS. 4A-4B are diagrams illustrating an internal support ring with a sleeve bearing.
Figure 4A:
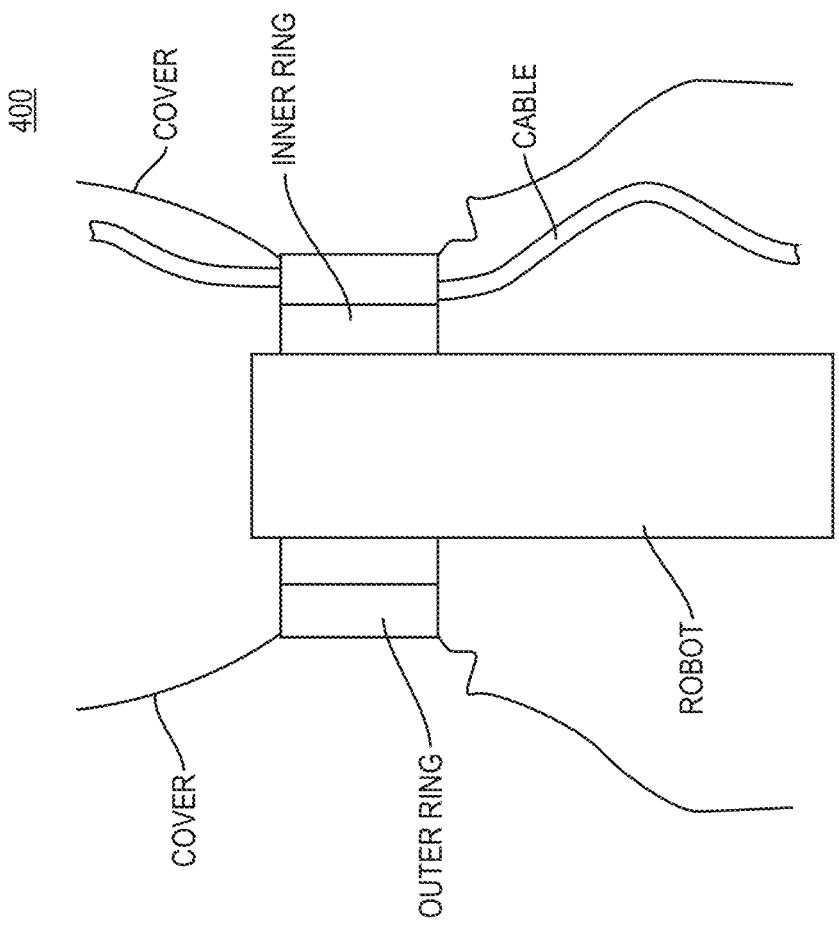

FIG. 4 is a diagram 400 of a support ring consisting of an inner, static ring 1 which is connected to the robot 6 and an outer, rotating ring 3, 4 which is connected to the inner ring 1 via a bearing. This bearing may be a ball bearing, a roller bearing, or a sleeve bearing. The elastic covering causes the outer, rotating ring 3, 4 to be fixed to fixed to the elastic covering via friction. By having a low friction, rotating interface between the cover, a tighter cover may be used as the total geometric change in the dimensions of the cover is reduced.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A cover for an automated robot, the cover comprising:
 a plurality of elastic sheets that are adhered to each other in a geometry, the geometry configured to allow the plurality of elastic sheets to expand and contract while the automated robot moves within its range of motion, the plurality of elastic sheets covering at least one joint of the automated robot;
 wherein the plurality of elastic sheets is attached to the automated robot by elasticity of the elastic sheets;
 wherein a first group of the elastic sheets forms a first elastic collar configured to grip the automated robot at a first opening of the cover; and
 wherein a first portion of the geometry corresponding to a first joint of the automated robot is configured to expand such that a total additional joint torque exerted by the cover is less than a maximum gravity compensation torque required for the first joint at a maximum load capacity of the automated robot.

2. The cover of claim 1, wherein the geometry is configured to durably stretch and durably contract the plurality of elastic sheets for the range of motion of the robot.

3. The cover of claim 1, further comprising:
malleable media, placed between the robot and the plurality of elastic sheets, such that the malleable media expands the cover from a surface of the robot and lessens constriction of elastic material onto the surface of the robot.

4. The cover of claim 1, wherein the elastic sheets are inflated to expand the cover from a surface of the robot to lessen constriction of the elastic sheets onto the robot surface.

5. The cover of claim 1, wherein the automated robot has up to seven degrees of freedom.

6. The cover of claim 1, wherein the geometry is configured with an entry point and an exit point, the geometry further configured to allow air to flow from the entry point to the exit point.

7. The cover of claim 6, wherein the entry point or exit point can further be configured to allow cables or hoses to enter the cover.

8. The cover of claim 1, further comprising:
internal support rings configured to prevent the cover from directly contacting the robot to reduce friction with the robot;
wherein at least one of the internal support rings including at least one hole that permits air, fluid, cables or hoses to be passed through them.

9. The cover of claim 1, further comprising:
at least one external support ring that is configured to support an external cable or hose attached to the automated robot.

10. The cover of claim 9, wherein the at least one external support ring is at least one of a strap, hose clamp, and elastic strap.

11. The cover of claim 1, wherein a second group of the elastic sheets forms a second elastic collar configured to grip the automated robot at a second opening of the cover.

12. The cover of claim 1, further comprising at least one internal support ring including an inner ring fixed to the robot and an outer ring which is connected to the inner ring by a low friction interface consisting of a ball bearing, roller bearing, or a sleeve bearing.

13. A method for covering an automated robot, the method comprising:
adhering a plurality of elastic sheets to each other in a geometry, the geometry configured to allow the plurality of elastic sheets to expand and contract while the automated robot moves within its range of motion, the plurality of elastic sheets covering at least one joint of the automated robot;
wherein the plurality of elastic sheets is attached to the automated robot by elasticity of the elastic sheets;
wherein a first group of the elastic sheets forms a first elastic collar configured to grip the automated robot at a first opening of the cover; and
wherein a first portion of the geometry corresponding to a first joint of the automated robot is configured to expand such that a total additional joint torque exerted by the cover is less than a maximum gravity compensation torque required for the first joint at a maximum load capacity of the automated robot.

14. The method of claim 13, wherein the plurality of elastic sheets is a plurality of non-porous elastic sheets, the geometry is configured based on the range of motion of the robot, the geometry configured to durably stretch and durably contract the plurality of non-porous elastic sheets for the range of motion of the robot.

15. The method of claim 13, wherein the plurality of elastic sheets is a plurality of non-porous elastic sheets, the method further comprising:
placing malleable media between the robot and the plurality of non-porous elastic sheets, such that the malleable media expands the cover from a surface of the robot and lessens constriction of elastic material onto the surface of the robot.

16. The method of claim 13, wherein the elastic sheets are inflated to expand the cover from a surface of the robot to lessen constriction of the elastic sheets onto the robot surface.

17. The method of claim 13, wherein the automated robot has up to seven degrees of freedom.

18. The method of claim 13, wherein the geometry is configured with an air intake hole to allow air to flow from a first end of the cover to a second end.

19. The method of claim 13, wherein:
the geometry is configured with an entry point and an exit point;
the geometry is further configured to allow air to flow from the entry point to the exit point; and
the entry point or the exit point can further be configured to allow cables or hoses to enter the cover.

20. The method of claim 13, further comprising:
configuring internal support rings to prevent the cover from directly contacting the robot to reduce friction with the robot;
wherein at least one of the internal support rings includes at least one hole that permits air, fluid, cables, or hoses to be passed through them.

* * * * *